United States Patent
Woerner

(10) Patent No.: US 7,540,189 B2
(45) Date of Patent: Jun. 2, 2009

(54) METHOD AND APPARATUS FOR DETECTION OF A VARIABLE PARAMETER OF A VEHICLE

(75) Inventor: Dieter Woerner, Kleingartach (DE)

(73) Assignee: KNORR-BREMSE Systeme für Nutzfahrzeuge GmbH, München (DE)

( * ) Notice: Subject to any disclaimer, the term of this patent is extended or adjusted under 35 U.S.C. 154(b) by 0 days.

(21) Appl. No.: 11/596,020

(22) PCT Filed: May 9, 2005

(86) PCT No.: PCT/EP2005/004981

§ 371 (c)(1),
(2), (4) Date: Jun. 12, 2007

(87) PCT Pub. No.: WO2005/111545

PCT Pub. Date: Nov. 24, 2005

(65) Prior Publication Data

US 2007/0266793 A1    Nov. 22, 2007

(30) Foreign Application Priority Data

May 11, 2004    (DE) .................. 10 2004 023 256

(51) Int. Cl.
*G01L 19/141*   (2006.01)
(52) U.S. Cl. ..................................... 73/432.1
(58) Field of Classification Search ............. None
See application file for complete search history.

(56) References Cited

U.S. PATENT DOCUMENTS

| | | | |
|---|---|---|---|
| 3,443,639 A | * | 5/1969 | Patterson et al. ........... 166/288 |
| 5,432,320 A | | 7/1995 | Scheidler et al. |
| 5,517,112 A | | 5/1996 | Vig et al. |
| 5,664,335 A | * | 9/1997 | Suman et al. ................. 33/356 |
| 2003/0042893 A1 | | 3/2003 | Sohn et al. |
| 2004/0237638 A1 | | 12/2004 | Reviol et al. |

FOREIGN PATENT DOCUMENTS

| | | |
|---|---|---|
| DE | 42 35 263 A1 | 4/1994 |
| DE | 42 35 880 A1 | 4/1994 |
| DE | 44 36 372 A1 | 4/1996 |
| DE | 102 24 058 A1 | 5/2003 |
| DE | 10 2004 007 721 | 8/2004 |

OTHER PUBLICATIONS

Translation of International Preliminary Report on Patentability from International Patent Application No. PCT/EP2005/004981, dated Dec. 7, 2006.
Written Opinion of the International Searching Authority from International Patent Application No. PCT/EP2005/004981, dated Sep. 6, 2005.

* cited by examiner

*Primary Examiner*—Robert R Raevis
(74) *Attorney, Agent, or Firm*—Kenyon & Kenyon LLP

(57) ABSTRACT

A method for detection of a variable parameter of a vehicle with the aid of a measurement device, by which measured values are evaluated as sensor signals of at least one sensor element which is arranged in the immediate vicinity of an actuating element with an electrical drive, in which no evaluation of the measured values is carried out or performed during an influencing time period between a time of a change in the electrical drive for the actuating element and a time in which this change is essentially still just exerting an influence on the measured values.

12 Claims, 2 Drawing Sheets

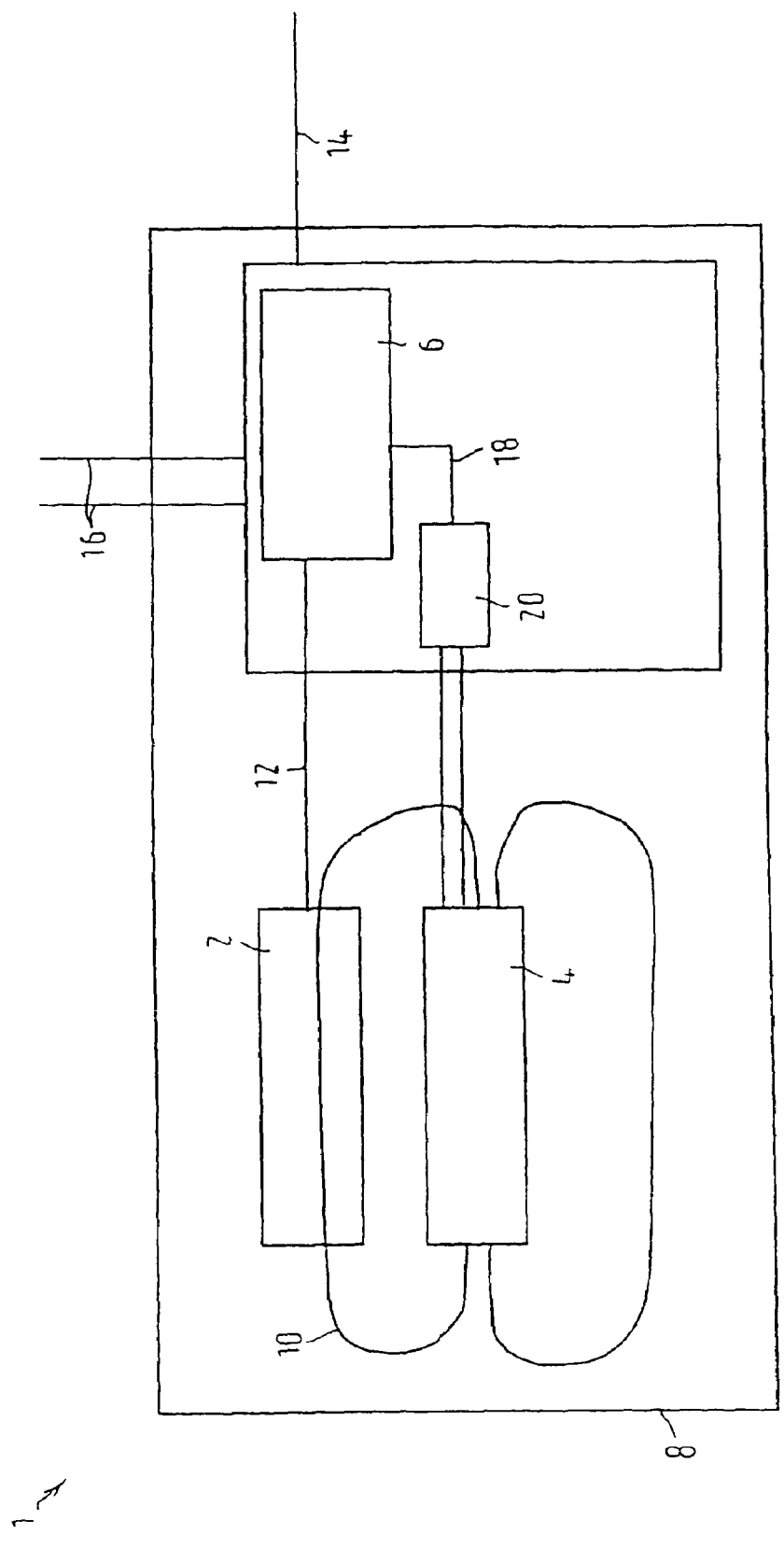

METHOD AND APPARATUS FOR DETECTION OF A VARIABLE PARAMETER OF A VEHICLE

RELATED APPLICATION INFORMATION

The present application claims the priority/benefit of PCT/EP2005/004981, which was filed on May 9, 2005, and which claims priority to and the benefit of German Patent Application No. 10 2004 023 256.3, the disclosures for which are incorporated herein by reference.

FIELD OF THE INVENTION

The exemplary method of present invention provides a method for detection of a variable parameter of a vehicle, in particular of a commercial vehicles, with the aid of a measurement device, by which sensor signals of at least one sensor element, which is arranged in the immediate vicinity of an actuating element with an electrical drive, are evaluated, and to an apparatus for carrying out the method.

BACKGROUND INFORMATION

Modern vehicles have a large number of mechatronic systems in which mechanical, electronic and data-processing components are linked to one another. Mechatronic systems play a major role in the form of control structures in vehicles. Examples are engine management for internal combustion engines, anti-lock braking systems, traction control systems, electronic stability systems, etc. These generally contain a measurement device of this generic type, as is described by way of example in DE 42 35 880 A1, by which sensor signals of at least one sensor element can be evaluated, as well as at least one actuating element with an electrical drive.

If the actuating element is arranged in the immediate vicinity of the sensor element, this results in the problem that the sensor signals which are produced by the sensor element are influenced by electrical and/or magnetic fields which occur in particular when there is a change in the electrical drive for the actuating element, and this results in measurement errors.

In order to solve this problem, it has been proposed in the prior art for the sensor element to be protected by shielding against interference influences on the actuating element, with the disadvantage of the costs incurred in consequence.

It is also known for the sensor element to supply sensor signals, or to be activated, only when there is no change in the electrical drive for the actuating element. However, the functions of the sensor element and of the actuating element must be synchronized for this purpose, and this involves a certain amount of complexity.

Finally, the interference influences of the electrical drive for the actuating element can be compensated for by computation. However, the interference behavior must be known for this purpose, and this may demand considerable computation complexity, depending on the application.

In contrast, the exemplary embodiment and/or method of the present invention is based on the object of further developing a method and an apparatus for detection of a variable parameter of a vehicle of the type mentioned initially, in such a manner that it provides better functional reliability and safety, as well as measurement accuracy, with costs that are as low as possible.

This object is achieved by the methods and systems described herein.

SUMMARY OF THE INVENTION

The exemplary embodiment and/or method of the present invention involves the fact that that there is a risk of measurement inaccuracies during an influencing time period between a time of a change in the electrical drive for the actuating element and a time in which this change is essentially still just exerting an influence on the measured values. The influencing time period generally ends when the actuating element has stabilized in the new state which results from the electrical drive.

According to a first aspect of the exemplary embodiment and/or method of the present invention, the sensor element admittedly always supplies sensor signals as measured values in the event of a change in the parameter to be detected, but these measured values are not evaluated during the influencing time period, in the sense that the evaluation of the measured values is ceased. In other words, the measured values are not evaluated at the start of and immediately after a change in the electrical drive for the actuating element.

According to a further aspect of the exemplary embodiment and/or method of the present invention, and subject to the same precondition, measured values which have been obtained during the influencing time period are evaluated only when the accuracy of the measured values exceeds a specific limit.

According to a further alternative, measured values are evaluated only when an estimated discrepancy between the measured values and an actual value is greater than the error caused by the influence.

In these cases, there is no need for complex synchronization of the functions of the sensor element and of the actuating element. All that is necessary is to monitor whether the electrical drive for the actuating element changes during the measurement. If this is the case, the measured values supplied from the sensor element are rejected, and are not evaluated. The evaluation of the sensor signals is continued only when the change in the drive for the actuating element no longer has any effect on the measured values, that is to say after the influencing time period has ended, when the electrical state of the actuating element has stabilized at the new level.

A measured value which is associated with one measurement time may be written to a memory and, if this measurement time is within the influencing time period, this measured value is rejected, and it otherwise it is evaluated or processed.

Alternatively, in the event of a change in the electrical drive for the actuating element, a measurement is terminated immediately or during or after the end of the influencing time period, and is started again after the end of the influencing time period.

The exemplary embodiment of the present invention also provides an apparatus for detection of a variable parameter of a vehicle. The exemplary embodiment and/or method of the present invention finally also relates to vehicles, in particular commercial vehicles, which are equipped with an apparatus such as this.

BRIEF DESCRIPTION OF THE DRAWINGS

FIG. 2 shows a schematic illustration of an apparatus for detection of a variable parameter of a vehicle, according to another exemplary embodiment of the present invention.

DETAILED DESCRIPTION

Figure 1:
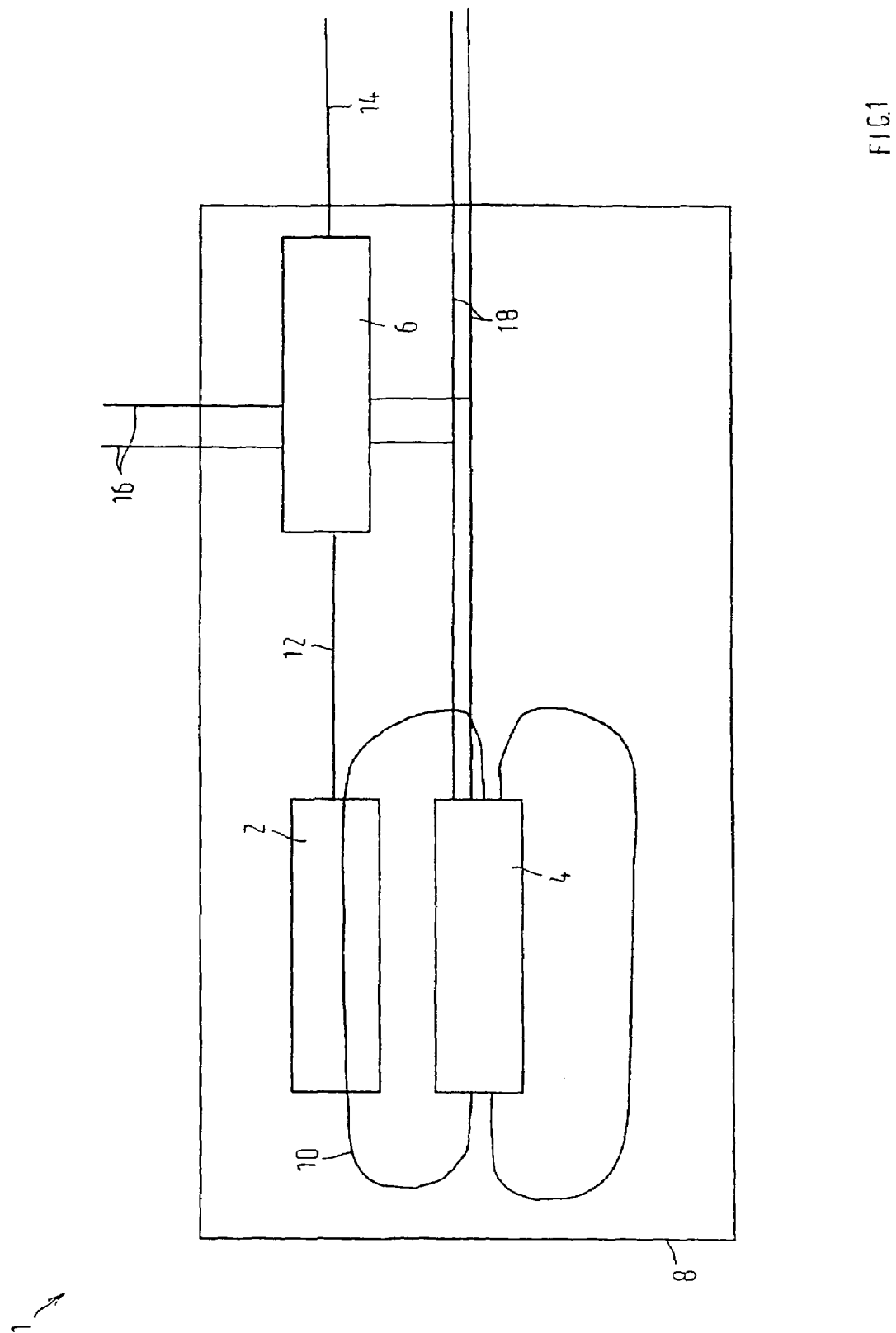
FIG. 1 shows a schematic illustration of an apparatus for detection of a variable parameter of a vehicle, according to an exemplary embodiment of the present invention.

The apparatus, which is annotated 1 overall in FIG. 1, for detection of a variable parameter of a vehicle includes a sensor element 2, an actuator which can be driven electrically as the actuating element 4, and an electronic evaluation device 6, with these components may be arranged in a common housing 8. In particular, the sensor element 2 is arranged in the immediate vicinity of the actuating element 4, so that the electrical or magnetic field which is produced when a change occurs in the drive for the actuating element 4 extends partially to the sensor element 2, as is indicated by the field lines 10 in FIG. 1.

The sensor element 2 supplies measured values as sensor signals via a signal line 12 to the electronic evaluation device, as a function of which the electronic evaluation device 6 in turn produces output signals via an external signal line 14. Furthermore, the evaluation device 6 is supplied with voltage from the outside by power cables 16. The actuating element 4 is, for example, driven by a further unit (which is not shown for scale reasons) via control lines 18, which branch off into the evaluation device.

The apparatus 1 for detection of a variable parameter is, for example, a component of a clutch actuator or a friction clutch in a commercial vehicle. In this case, the sensor element is, for example, a movement sensor 2, which measures the disengagement movement of the friction clutch. The actuating element then includes a solenoid valve 4 which can be driven electrically.

Against this background, the method of operation of the apparatus 1 is as follows:

The sensor element 2 produces measured values continuously in the event of a change in the parameter to be detected, for example the disengagement movement of the friction clutch. The evaluation device 6 writes the measured values to a memory via the signal line 12. If the actuating element 4 is now externally driven via the control lines 18, which corresponds to a change in its drive, then the evaluation drive 6 also receives a corresponding signal via the control lines 18, and it associates this signal with a time of the start of the change in the drive for the actuating element 4. An empirical value for an influencing time period between the time of the change in the electrical drive for the actuating element 4 and a time in which this change is essentially still just exerting an influence on the measured values supplied from the sensor element 2 is stored in a stored characteristic field in the evaluation device 6. This influencing time period is generally ended when the electrical state of the actuating element 4 has stabilized at the new level.

According to the exemplary embodiment and/or method of the present invention, the evaluation device 6 is designed in such a manner that no evaluation of the measured values is carried out during the influencing time period. To be more precise, a measured value which is associated with a measurement time is written to the memory for the evaluation device 6 and, if this measurement time is within the influencing time period, it is rejected, and is otherwise evaluated or processed.

If one application requires measurements over a lengthy time period and a change in the electrical drive for the actuating element 4 occurs during this time period, then the evaluation of the measured values can also be terminated and can be started from the beginning again once the influencing time period has elapsed. In the event of a change to the electrical drive for the actuating element, a measurement may be terminated immediately or during or after the end of the influencing time period, and is started again after the end of the influencing time period.

Alternatively, an evaluation of the measured values is carried out during the influencing time period only when the accuracy of the measured values exceeds a specific limit. This limit can likewise be stored in the memory for the evaluation device 6.

In the second exemplary embodiment of the present invention as shown in FIG. 2, those parts which remain the same and have the same effect as those in the previous example are identified by the same reference symbols. In contrast to FIG. 1, the control functions for the actuating element 4 are at the same time integrated in the electronic evaluation device 6, so that this also forms a controller for them. The control lines 18 in consequence do not extend into the area outside the housing 8, but only between the evaluation device 6 and the actuating element 4, where an output stage 20 is also arranged. The method of operation of this exemplary embodiment is described in the same way as in the case of the previous exemplary embodiment.

The list of reference symbols is as follows:
1 Apparatus
2 Sensor element
4 Actuating element
6 Evaluation device
8 Housing
10 Field lines
12 Signal line
14 Signal line
16 Power cable
18 Control line
20 Output stage

The invention claimed is:

1. A method for detection of a variable parameter of a vehicle using a measurement device, the method comprising:
   measuring values with the measurement device; and
   evaluating the measured values as sensor signals of at least one sensor element of the measurement device which is arranged in an immediate vicinity of an actuating element of the vehicle with an electrical drive;
   wherein no evaluation of the measured values is performed during an influencing time period between a time of a change in an electrical drive for the actuating element of the vehicle and a time in which the change is essentially still exerting an influence on the measured values.

2. The method of claim 1, wherein a measured value which is associated with one measurement time is written to a memory, and if this measurement time is within the influencing time period, the measured value is rejected, and otherwise it is evaluated.

3. The method of claim 1, wherein in the event of a change in the electrical drive for the actuating element of the vehicle, a measurement is terminated one of immediately, during and after an end of the influencing time period, and is started again after the end of the influencing time period.

4. The method of claim 1, wherein a measured value which is associated with one measurement time is written to a memory, and if this measurement time is within the influencing time period, the measured value is rejected, and otherwise it is evaluated, or wherein in the event of a change in the electrical drive for the actuating element of the vehicle, a measurement is terminated one of immediately, during and after an end of the influencing time period, and is started again after the end of the influencing time period.

5. An apparatus for detection of a variable parameter of a vehicle, comprising:

a measuring device to measure values;
an evaluating arrangement to evaluate the measured values as sensor signals of at least one sensor element; and
at least one actuating element of the vehicle with an electrical drive in an immediate vicinity of the at least one sensor element;
wherein, during an influencing time period between a time of a change in an electrical drive for the actuating element of the vehicle and a time in which the change is essentially still exerting an influence on the measured values, no evaluation of the measured values is performed.

6. The apparatus of claim 5, wherein a measured value which is associated with one measurement time is written to a memory, and if this measurement time is within the influencing time period, the measured value is rejected, and otherwise it is evaluated.

7. The apparatus of claim 5, wherein in the event of a change in the electrical drive for the actuating element of the vehicle, a measurement is terminated one of immediately, during and after an end of the influencing time period, and is started again after the end of the influencing time period.

8. The apparatus of claim 5, wherein a measured value which is associated with one measurement time is written to a memory, and if this measurement time is within the influencing time period, the measured value is rejected, and otherwise it is evaluated, or wherein in the event of a change in the electrical drive for the actuating element of the vehicle, a measurement is terminated one of immediately, during and after an end of the influencing time period, and is started again after the end of the influencing time period.

9. A vehicle comprising:
an apparatus for detection of a variable parameter of a vehicle, including:
a measuring device to measure values;
an evaluating arrangement to evaluate the measured values as sensor signals of at least one sensor element of the measurement device; and
at least one actuating element of the vehicle with an electrical drive in an immediate vicinity of the at least one sensor element;
wherein, during an influencing time period between a time of a change in an electrical drive for the actuating element of the vehicle and a time in which the change is essentially still exerting an influence on the measured values, no evaluation of the measured values is performed.

10. The vehicle of claim 9, wherein a measured value which is associated with one measurement time is written to a memory, and if this measurement time is within the influencing time period, the measured value is rejected, and otherwise it is evaluated.

11. The vehicle of claim 9, wherein in the event of a change in the electrical drive for the actuating element of the vehicle, a measurement is terminated one of immediately, during and after an end of the influencing time period, and is started again after the end of the influencing time period.

12. The vehicle of claim 9, wherein a measured value which is associated with one measurement time is written to a memory, and if this measurement time is within the influencing time period, the measured value is rejected, and otherwise it is evaluated, or wherein in the event of a change in the electrical drive for the actuating element of the vehicle, a measurement is terminated one of immediately, during and after an end of the influencing time period, and is started again after the end of the influencing time period.

* * * * *